UNITED STATES PATENT OFFICE.

ELLA MARY FREELEY, OF NEW YORK, N. Y.

VULCANIZED RUBBER AND TEXTILE FABRIC.

SPECIFICATION forming part of Letters Patent No. 340,501, dated April 20, 1886.

Application filed December 20, 1884. Renewed October 2, 1885. Serial No. 178,818. (Specimens.)

*To all whom it may concern:*

Be it known that I, ELLA MARY FREELEY, a citizen of the United States, residing at the city of New York, in the county of New York and State of New York, have invented certain new and useful Improvements in Vulcanized Rubber and Textile Fabrics, of which vulcanized rubber is a component part; and I do hereby declare that the following is a full, clear, and exact description of the invention, which will enable others skilled in the art to which it appertains to make and use the same.

Heretofore, as is well known, the most serious objection to the use of vulcanized rubber, whether hard or soft, has been the disagreeable odor which emanates therefrom, caused by the use of sulphur in vulcanization. This defect in the article has heretofore been temporarily obviated by the use of some substance which had a stronger and less disagreeable smell than the sulphur—as, for instance, by the use of carbolic acid. This method of improving the article, besides being temporary, is open to the more serious objection of giving the article a smell which, though less unpleasant than the sulphur, is still by no means agreeable.

The object of my invention is to obviate these defects in vulcanized rubber by destroying entirely the sulphurous smell therein, and by giving to the said goods a wholesome odor which will be objectionable to no one.

The process to which I subject the goods, besides destroying the sulphurous odor, toughens the goods and renders them less liable to be softened by oils or acids, as often happens in the case of rubber belting when in contact with machine oil on shaftings.

To accomplish this purpose, I take a solution composed of salicylic acid and alcohol, preferably in the proportion of twenty grains of salicylic acid to half a pint of alcohol, and dip the vulcanized rubber therein, which destroys the sulphurous smell and leaves the article odorless. This solution will entirely deodorize the article without putting it through the process next mentioned; but I prefer making use of the additional process, as it toughens the goods, and makes them more readily absorb any perfume that may be added to them. Besides the process next mentioned has very great deodorizing qualities. I then place the said article in a hot or cold solution made of fifty pounds of bark of oak, fifty pounds of bark of hemlock, fifty pounds of bark of sumac, nine hundred gallons of water, salicylic soda in the proportion of twenty grains of salicylic soda to every two gallons of the solution of the barks and water, and a large table-spoonful of Russian jachten extract dissolved in one pint of alcohol, half a pint of ether, and five grains of salicylic acid. These proportions may be varied somewhat; but I find the proportions above mentioned to work most satisfactorily in actual use. If, however, one or more of the barks be omitted from the solution, the number of pounds of the remaining bark or barks must be correspondingly increased.

When the vulcanized rubber has been submitted to this process, the odor of sulphur and rubber has been entirely destroyed, and the article has a sweet and wholesome perfume, and is more durable.

What I claim as new, and desire to secure by Letters Patent, is—

As an improved article of manufacture, hard or soft vulcanized rubber or textile fabric of which vulcanized rubber is a component part, dipped in a solution of salicylic acid and alcohol, or in a solution of bark of oak, bark of hemlock, bark of sumac, water, salicylic soda, Russian jachten extract, alcohol, ether, and salicylic acid, in the proportions and in the manner specified, or dipped in both of said solutions, substantially as and for the purpose described.

In witness whereof I have hereunto set my hand and seal in the presence of two subscribing witnesses.

ELLA MARY FREELEY. [L. S.]

Witnesses:
 DAVID R. GARNISS,
 FRANCIS HIGGINS.